United States Patent
Fulknier et al.

(10) Patent No.: US 7,813,314 B2
(45) Date of Patent: Oct. 12, 2010

(54) MOBILE ROUTER DEVICE

(75) Inventors: John C. Fulknier, Cambridge, MA (US); Brian J. Smith, Cambridge, MA (US)

(73) Assignee: Waav Inc., Cambridge, MA (US)

( * ) Notice: Subject to any disclaimer, the term of this patent is extended or adjusted under 35 U.S.C. 154(b) by 764 days.

(21) Appl. No.: 11/497,892

(22) Filed: Aug. 2, 2006

(65) Prior Publication Data

US 2007/0030857 A1 Feb. 8, 2007

Related U.S. Application Data

(60) Provisional application No. 60/595,747, filed on Aug. 2, 2005.

(51) Int. Cl.
*H04W 4/00* (2009.01)
(52) U.S. Cl. .............. 370/328; 370/338; 455/422.1
(58) Field of Classification Search .......... 370/310, 370/328, 338, 311, 318, 359, 419, 463, 401, 370/310.2, 277; 455/422.1, 3.01, 3.06, 403, 455/424, 503, 41.2, 428, 445, 557
See application file for complete search history.

(56) References Cited

U.S. PATENT DOCUMENTS

| | | | |
|---|---|---|---|
| 5,771,229 A | 6/1998 | Gavrilovich | |
| 6,253,247 B1 | 6/2001 | Bhaskar et al. | |
| 6,311,279 B1 * | 10/2001 | Nguyen | 713/300 |
| 6,411,632 B2 | 6/2002 | Lindgren et al. | |
| 6,452,910 B1 * | 9/2002 | Vij et al. | 370/310 |
| 6,747,964 B1 | 6/2004 | Bender | |
| 6,763,226 B1 | 7/2004 | McZeal, Jr. | |
| 6,842,446 B2 | 1/2005 | Everson et al. | |
| 6,850,512 B1 | 2/2005 | Bishop et al. | |
| 6,862,500 B2 | 3/2005 | Tzamaloukas | |
| 6,925,378 B2 | 8/2005 | Tzamaloukas | |
| 6,980,524 B1 * | 12/2005 | Lu et al. | 370/254 |
| 6,999,458 B2 | 2/2006 | Fowler | |
| 6,999,785 B2 | 2/2006 | Kito | |
| 7,068,669 B2 | 6/2006 | Abrol et al. | |
| 7,076,365 B2 | 7/2006 | Tzamaloukas | |
| 7,082,467 B2 | 7/2006 | Border et al. | |
| 7,133,404 B1 | 11/2006 | Alkhatib et al. | |

(Continued)

OTHER PUBLICATIONS

Phatak et al. A Novel Mechanism for Data Streaming Across Multiple IP Links for Improving Throughput and Reliability in Mobile Environments INFOCOM vol. 2 pp. 773-781 Nov. 2002.

(Continued)

*Primary Examiner*—Huy Phan
(74) *Attorney, Agent, or Firm*—Edward L. Kelley DBA; Invention Management Associates

(57) ABSTRACT

A wireless mobile router (140) includes wireless network interfaces (202) and (218) attached to a network controller (142). The wireless network interface (202) communicates with a cellular network (110) to access cellular network services. The wireless network interface (218) and the network controller (142) comprise a WLAN (170) or PAN (180) network router hosting a plurality of client devices. Each client device may access a wide area network, WAN over the cellular network. The wireless mobile router (140) is configured to exchange various cellular network signals with various WLAN and PAN networks. The wireless mobile router (140) is particularly suitable for use in a vehicle or at locations where WAN access is not readily available.

20 Claims, 2 Drawing Sheets

U.S. PATENT DOCUMENTS

| | | |
|---|---|---|
| 7,139,841 B1 | 11/2006 | Somasundaram et al. |
| 2003/0013468 A1 | 1/2003 | Khatri |
| 2003/0223450 A1 | 12/2003 | Bender et al. |
| 2004/0017794 A1* | 1/2004 | Trachewsky ............. 370/338 |
| 2004/0032910 A1 | 2/2004 | Horng et al. |
| 2004/0196798 A1 | 10/2004 | Abousleman |
| 2005/0010573 A1 | 1/2005 | Garg |
| 2005/0163093 A1 | 7/2005 | Garg et al. |
| 2006/0063546 A1 | 3/2006 | Fischer |
| 2006/0193295 A1 | 8/2006 | White et al. |

OTHER PUBLICATIONS

Hung Yun et al. A Transport Layer Approach for Achieving Aggregate Bandwidths on Multihomed Mobile Hosts, MOBICOM'02, Sep. 23-26, 2002, Atlanta, Georgia.

* cited by examiner

MOBILE ROUTER DEVICE

CROSS REFERENCE TO RELATED US PATENT APPLICATIONS

This application claims priority under 35 U.S.C. 119(e) based upon Provisional Application Ser. No. 60/595,747, entitled INTERNET MOBILE ROUTER DEVICE, filed Aug. 2, 2005, which is incorporated herein in its entirety. This application relates to U.S. application Ser. No. 11/650,634 entitled MOBILE ROUTER DEVICE, filed on Jan. 6, 2007 as a continuation in part application of the present application.

BACKGROUND OF THE INVENTION

1. Field of the Invention

The present invention relates to a wireless network router that interfaces with a cellular network and forms a wireless local area network surrounding the wireless network router. In particular, the wireless network router is configured for mobile use and includes a cellular network transceiver, to maintain a substantially continuous connection with a cellular wireless network and exchanges content and other data between the cellular network and the wireless local area network created by the router.

2. Description of the Related Art

Mobile computer and other mobile electronic device users are increasingly relying on continuous access to Wide Area Networks, (WAN's), such as the world wide web, (www), Internet, Intranets, etc. to access data and software tools and to remain in continuous communication with others, e.g. by email, instant message, telephone, etc. Recently, wireless communication systems utilizing designated radio frequency bands have allowed mobile devices to interconnect with a WAN whenever the mobile device is within the usable range of a compatible wireless network.

Conventional wireless local area networks, (WLAN) are often deployed inside structures such as homes, offices and public and commercial buildings for networking with client mobile computers and other client mobile electronic devices. In addition, larger wireless network deployment over a campus or city is also known to network with a large number of client mobile computers and other client mobile electronic devices. Generally a wireless network deployed over a usable range includes a wire network interface to a WAN e.g. through an internet server. In these wireless networked areas a client device can usually access a WAN through the wire network interface and may have continuous access to a WAN as needed as long as the client device remains within the usable range of the wireless network.

A typical problem faced by the average wireless local area configured client device user is that when the client device leaves a WLAN zone, the client device can not communicate with a WAN or WLAN to access network services. This problem has been addressed by cellular network providers by providing cell phones and PDA's with access to a WAN over a cellular network and by equipping cell phones and PDA's with basic email and web content display and editing functionality. However cell phones and PDA's are not equipped to perform even routine computer tasks and most portable computers are not equipped with cellular network interfacing gear. Accordingly, there is still a need to provide WAN access to mobile users wishing to perform routine computer tasks in places where network access is not available, e.g. when traveling in a vehicle, watercraft or aircraft or when traveling for work or pleasure.

Generally, cellular networks provide broad or global coverage areas and provide WAN access and other services to cellular configured client devices. However, there is no convenient way for a WLAN configured client device, e.g. a lap top computer or other portable electronic device to access a cellular network and take advantage of the services provided by the cellular network. In addition, satellite telecommunication networks, (STN), provide broad or global coverage areas and provide WAN access and other services to STN configured devices. However, there is no convenient way for a WLAN configured client device, e.g. a lap top computer or other portable electronic device to access a STN and take advantage of the services provided by the STN.

BRIEF SUMMARY OF THE INVENTION

The present invention overcomes the problems cited in the prior art by providing a mobile network router (140) having a network controller (142) configured as a PC board or mother board. The router (140) includes a first wireless network interface device (202) configured as a cellular network interface device for exchanging network signals with a cellular network such as an EVDO configured cellular network. In particular, the router may access a WAN 100 through the cellular network.

The router (140) further includes a second wireless network interface device (218) configured to exchange second wireless network signals with a second wireless network, such as a wireless local area network WLAN (170) configured as a Wi-Fi, WiMax, or other WLAN network or configured as a personal area network, (PAN) 180 such as a Bluetooth, ZigBee, UWB or other PAN network. In addition, network controller (142) is configured as a router for hosting a plurality of WLAN or PAN configured client devices and for directing network traffic between the client devices and a cellular network to access a WAN.

Specifically, the router (140) is configured to exchange signals between wireless networks of different configurations by exchanging wireless network signals with the first wireless network and the network controller (142) using the first wireless network interface device (202) and between the second wireless network and the network controller (142) using the second wireless network interface device (218). The router controller (142) then converts the first wireless network signals to the configuration of second wireless network signals and converts the second wireless network signals to the configuration of first wireless network signals. Thereafter, network traffic is directed between the first wireless network and the second wireless networks.

BRIEF DESCRIPTION OF THE DRAWINGS

The features of the present invention will best be understood from a detailed description of the invention and a preferred embodiment thereof selected for the purposes of illustration and shown in the accompanying drawing in which.

DETAILED DESCRIPTION OF THE INVENTION

Figure 1:
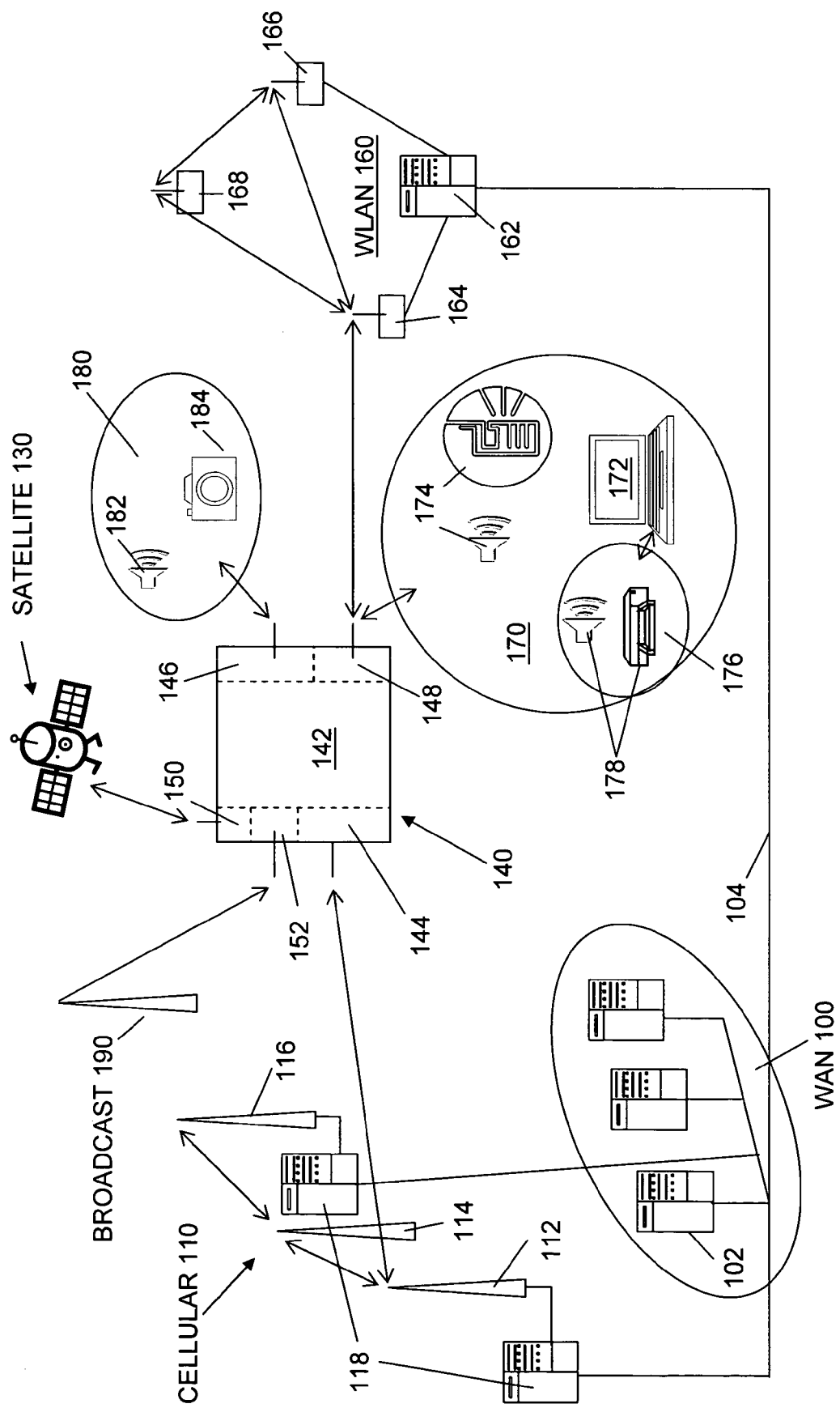
FIG. 1 illustrates a schematic representation of one example of a network environment including a mobile router according to the present invention.

Turning to FIG. 1, one example of a wireless network environment is shown schematically. The network environment includes a wide area network WAN 100. The WAN generally comprises a plurality of network devices 102, e.g. servers, digital data storage devices, telephone switching gear and network traffic controllers, all interconnected by a wire and sometimes wireless, e.g. microwave, infrastructure 104, such as the world wide web, (www), and other global telecommunications infrastructures. The WAN network 100 comprises a host to many network clients with each network client having a unique network ID such as an Internet Protocol Address, (IP Address), a Uniform Resource Locator, (URL), an email address, a telephone number etc.

Generally communication signals passed over the WAN network 100 include, digital and analog electrical signals generally transmitted through the network infrastructure and generally being communicated from one specific client device to another or from one client device to many specific client devices. The digital and analog signals may include a telephone call between two users, an email sent from one client device to one or more other client devices or a client browser request to access to a particular server or network client device to exchange data files there between.

Generally, network interface elements are included local to or incorporated within each client device. In addition, the WAN 100 and infrastructure 104 includes various network interface elements. Network interface elements are used to format network signals, to associate a network address to a client device network, and generally to allow network signals to be exchanged between client devices of many types and configurations. A common wire network interface element is the Ethernet interface module installed in many client devices. An Ethernet interface module generally operates according to the IEEE standard 802.3 to divide data into frames or packets and format the frames according to a communication protocol such as the Transmission Control Internet Protocol, (TCP/IP). Of course other wire network interface device types are also in use and usable with the present invention.

In addition, the WAN 100 includes network control elements configured to interface with the infrastructure 104 and with other host networks, to direct network traffic, to control access to the network, to measure network parameters etc. Typical WAN network control elements comprise network servers configured to establish a host/client relationship with many thousands of client devices and to manage signal exchanges there between.

The network environment also includes a cellular network, generally 110. The cellular network 110 comprises a plurality of wireless network access points, 112, 114, 116 configured as radio transceivers. In the example of FIG. 1, a first access point comprises a base station 112. Generally the base station 112 is in communication with a cellular network controller or router 118. The network controller 118 may comprise a computer or server positioned local to the base station 112 and connected to the WAN 100 via a wire or microwave link. Alternately, the base station 112 may be connected to the WAN via a wire or microwave link and the network controller or router 118 may reside anywhere on the WAN 100. In addition, each cellular access point 112, 114, 116 exchanges wireless signals with other cellular access points to communicate with the base station 112 and network controller 118.

The cellular network controller 118 controls communication traffic on the cellular network. In particular, the cellular network is a host network having a plurality of client devices. The cellular network controller 118 controls the network traffic to each client device and may provide different network services to different client devices. In addition, the cellular network controller 118 may provide a cellular network client device with access to the WAN 100.

Generally, cellular network access points 112, 114, 116, (cell towers), comprise one or more radio transceivers, usually elevated above the ground, capable of providing cellular network coverage over a useful range. Each cellular access point may communicate with a plurality of cellular client devices such as any device configured according to the cellular network standards, such that each cellular client device located within the useful range of an access point is able to exchange signals with the cellular network and if needed a WAN. Moreover, the cellular network useful range may extend over a very wide area when the base station 112 and other access points 114, 116 are configured to exchange radio signals with adjacent access points to thereby relay radio signals between the base station 112 and every other cell sight 114, 116. Accordingly, the cellular network provides a wireless communication infrastructure for communicating with a plurality of wireless client devices disposed within the useful range of any cellular access point and for connecting each client wireless device to a WAN 100.

Generally, a cellular network is configured to operate using radio frequencies ranging from about 0.8-2.2 GHz. In addition, a cellular network is configured to operate using a cellular network message exchange or communication protocol standard such as any one of the Global System for Mobile Communications (GSM), General Packet Radio Service (GPRS), Universal Mobile Telecommunications System (UMTS), High-Speed Downlink Packet Access (HSDPA), High-Speed Uplink Packet Access (HSUPA), Code Division Multiple Access (CDMA), Evolution-Data Optimized (EVDO), Enhanced Data Rates for GSM Evolution (EDGE), 3GSM, Digital Enhanced Cordless Telecommunications (DECT), Digital AMPS (IS-136/TDMA), or Integrated Digital Enhanced Network (iDEN), etc.

In practice, different cellular network providers use different radio frequency bands and or different network exchange or communication protocol standards. However, it is typical that a single cell tower may include a plurality of cellular access points each using a different radio frequency band and or a different network exchange or communication protocol standard such that the cellular network 110 may actually comprise a plurality of cellular networks operating in the same region. Conversely, a typical cellular client device, e.g. a cell phone or PDA includes a network interface device configured to communicate with only one type of cellular network. In addition, each cellular client device is generally assigned a unique device ID, e.g. a phone number, to uniquely identify the device and to establish a one to one communication link between the cellular client device and another device via the access point and cellular network controller 118.

The wireless network environment may also include a Satellite Telecommunication Network, (STN) generally 130. The STN includes a ground-based base station and network controller, not shown, and at least one orbiting satellite access point configured with a transceiver for exchanging electromagnetic signals between the STN network controller and the satellite. In addition, the satellite may transmit broadcast signals to ground based client devices or may exchange two way communication signals with ground based STN configured client devices. In one example, an STN may comprise the global position system, (GPS) used to transmit wireless signals from satellites to ground-based STN configured signal receivers for allowing each ground-based STN signal receiver to calculate its position. Alternately, the STN may comprise one or more television or radio broadcast satellites configured to broadcast digitized television and radio, or any other digitized video and or audio signals, over a wide area to ground based STN configured client device receivers. In addition, STN-configured client telephone and video phone devices are able to connect with other telephone/videophone exchanges through the ground-based STN network controller. In addition, the ground-based STN network controller may be in communication with the wire infrastructure 104 and the WAN 100 such that a ground-based STN-configured client device may gain access to a WAN 100 via a satellite transmission. As with other networks, the STN controller may control access to the STN network.

The network environment may also include one or more substantially permanent wireless local area networks, (WLAN) 160. Generally a permanent WLAN 160 comprises a wireless network access point formed at a base station 164. The permanent WLAN 160 may also comprise additional wireless access points 166 and 168 disposed to extend the useable range of the WLAN 160 and configured to communicate with the base station 164 using wireless and or wire connections to relay network signals to every access point 164, 166, 168. Each access point 164, 166, 168 includes a wireless transceiver configured to exchange communication signals with WLAN configured client devices and with other WLAN access points.

The base station 164 may include a network controller configured to host WLAN configured client devices. The network controller functions as a network router to assign each client device a network address and to control network traffic between the host base station 164 and client devices. The base station 164 usually connects with a server 162, which may also form the network controller, and the server 162 connects with the local wire infrastructure 104 to provide each client device with access to the WAN 100.

Generally a permanent WLAN 160 may be installed inside a structure to provide wireless network access over the entire structure or a portion thereof. In another example, the permanent WLAN 160 may comprise a wide area wireless network, or Metropolitan Area Network, (MAN), spanning a campus or urban area with a plurality of access points and base stations 164, 166, 166 and may include more than one server 162 and more than one base station 164 and may be interconnected with wired local area networks as well.

Generally the WLAN 160 communication is based on the Wi-Fi or IEEE 802.11 communication standard which defines how signals are to be formatted and communicated using radio wave frequencies in the range of 2.4-2.5 GHz and or 5.15-5.8 GHz. Conversely MAN network communication may use the microwave frequency based Worldwide Interoperability for Microwave Access, (WiMAx) or IEEE 802.16 communication standard which defines how signals are formatted and communicated using microwave frequencies in the range of 2-11 GHz with WiMAx operating on 2.1 and 5.8 GHz.

In addition to the above listed networks, the network environment may further include a plurality of traditional public radio and television broadcast networks as well as a plurality of two-way radio voice and pager networks all generally represented by the network access point 190. In particular, the network access point 190 may comprise broadcast signals able to be received by properly configured radio or television signal receivers located within the usable network range, or the network access point 190 may comprise one or more transceivers used for two-way radio communication by military, municipal, corporate, and private radio network providers to communicate with any properly configured signal transceiver located within the usable network range. Generally the network access point 190 includes broadcast signals such as free radio, and television broadcast signals pay radio and television broadcast signals, selected two-way radio communication bands and various special purpose radio networks.

Mobile Router Interface Devices

According to the present invention, a mobile router 140 comprises a stand alone wireless network interface device configured to operate in the above described network environment. In particular, the mobile router 140 is configured to operate in a moving vehicle and to access one or more host wireless network access points as the vehicle traverses over a network environment. More specifically, the mobile router 140 is configured to seek a wireless network access point, to gain access to a host wireless network associated with the wireless network access point and to become a client of the host wireless network. Once the mobile router is a client of the host wireless network, the mobile router is configured to exchange network signals with the host wireless network. In particular, the mobile router 140 may be configured to become a client of one or more host wireless networks simultaneously.

The mobile router 140 is further configured as a wireless network access point configured to host one or more network configured devices, either inside the vehicle or local to the mobile router 140. The mobile router 140 comprises a wireless network controller and a wireless network base station configured to communicate with one or more wireless network configured client devices. Thus according to the present invention, the mobile router 140 comprises a client device on a first wireless network or on a plurality of first networks and a host device communicating with one or more client devices on a second wireless network. Generally, the first wireless network is a substantially permanent and fixed network of the network environment, while the second wireless network is movable with the mobile router 140, e.g. in a moving vehicle, or the second wireless network is portable with respect to the fixed network environment infrastructure.

The mobile router 140 is configured to exchange first network signals with the first host wireless network or plurality of first host wireless networks and to exchange second network signals with one or more second client devices. Moreover, the mobile router 140 is configured to reconfigure the first network signals into a configuration of the second network to provide second network signals and to reconfigure second network signals into the configuration of the first network(s) to provide first network signals as required to exchange signals between the first and second networks. The mobile router 140 is further configured to route first network signals from the first network(s) proper clients in the second network. The mobile router 140 also operates to receive network traffic from the clients of the second network and to aggregate second network traffic together and balance the second network traffic it over connections with first network (s) in order to increase communication bandwidth and or speed in accordance with instantaneous conditions of the first network(s).

The mobile router 140 is configured to search for host wireless network access points and to select and connect with an optimal host wireless network access point, e.g. highest signal strength, lowest price, most secure, etc. Moreover, the mobile router 140 is configured to continuously or periodically monitor the network environment, to evaluate every available host wireless network access point, and to select and connect with a more optimal host wireless network access point if one becomes available. Moreover, the wireless router 140 is configured to change wireless access points and to change first networks in order to maintain a continuous connection with a WAN 100. In addition, the wireless router 140 is configured maintain wireless network host status with one or more first networks or to maintain wireless network host status with a single first network as a plurality of host devices in order to maintain a continuous connection with a WAN 100 or to direct network traffic to a plurality of host network access points simultaneously.

As shown in FIG. 1, the mobile router 140 includes a controller 142, and one or more wireless network interface devices, 144, 146, 148, 150, 152 in communication with the controller 142. Generally the network interfaces devices shown in FIG. 1 are each configured to communicate with a different wireless network type and to deliver network signals of each different network type to the controller 142.

Each network interface device 144, 146, 148, 150, 152 comprises an antenna configured to receive analog electromagnetic wave signals in a particular frequency range and a receiver configured to convert the analog electromagnetic wave signals received into digital signals formatted as required for delivery to the controller 142. The receiver may also include a signal amplifier incorporated in the antenna, incorporated in the mobile router 140 or installed between the antenna 232 and the router 140.

Some or all of the network interface devices, 144, 146, 148, 150, and 152 also include a signal transmitter configured to transmit analog electromagnetic wave signals in a particular frequency range and with a desired signal power amplitude through the antenna. Each signal transmitter is configured to receive digital signals from the controller 142 and to convert the digital signals into analog electromagnetic wave signals in a particular frequency range and formatted as required for radio transmission over the entire usable range. The transmitter may also include a signal amplifier incorporated in the antenna, incorporated in the mobile router 140 or installed between the antenna 232 and the router 140.

In some instances, a entire network interface device 144, 146, 148, 150, 152 may be disposed external to the wireless router 140 and interface with the wireless router through the I/O interface 228 or by wireless communication through another wireless interface device included in the mobile router 140. In particular some vehicle may be equipped with built-in antennas, GPS receivers, satellite radio and television receivers etc. and these elements may be used to interface with the mobile router 140 and deliver network services to client devices.

Generally, the router 142 exchanges control, communication and power signals with each network interface device 144, 146, 148, 150, 152. The controller 142 may also process a communication signal received from a first network interface device over a first network type to reconfigure the communication signal to be transmitted over a second network interface device over a second network type. The controller 142 may also process the power signals, e.g. to process and reconfigure the proper signal strengths of wireless network signals, for each client in the second network and when retransmitting information from the first network or to monitor power conditions and to switch from external power to battery power, or to conserve energy, or to notify a user of a power problem, etc. The controller 142 may also process control signals as required to control communication signal traffic. In addition, the controller 142 is configured as one or more network routers operating to manage network communications with a plurality of client devices.

In one example according to the present invention, a first network interface device 144 may comprise a cellular network interface device configured to communicate with a cellular network 110. In particular, the network interface device 144 exchanges signals with one or more cellular network access points 112, 114, 116, gains access to become a client of the cellular network 110, and if possible uses services of the cellular network 110 to gain access to the WAN 100, send or receive a fax, or establish an audio or video conference link through the cellular networks 110.

A second network interface device 148 may comprise a WLAN interface device configured to communicate with a WLAN network 160. In particular, the network interface device 148 exchanges signals with the WLAN network using one or more access points, 164, 166, 168, gain access to and become a client of the WLAN network 160, and if possible to gain access to services of the WLAN network 160, e.g. to gain access to the WAN 100, or receive WLAN specific content.

In particular, the WLAN specific content may include SSID information and access point timing or signal strength and in conjunction with a known database of WLAN access point locations, may be used as another method of inferring the mobile router's location. If position is already known through some other means (such as GPS), then this database may be updated with the inferred position of WLAN access point along with its SSID information.

A third network interface device 146 may comprise a personal area network, PAN, interface device configured to communicate with one or more PAN networks or devices. In particular, the third network device 146 forms a host network to use all available client devices, such as any PAN configured client device such as Bluetooth devices or Ultra-Wide-Band (UWB) video screens etc. Furthermore, the mobile router 140 may comprise a client another PAN network such as a local personal computer 172 (or any local PDA or cellphone).

A fourth wireless network interface device 150 comprises an STN interface device configured to communicate with an STN network or network device 130. In particular, the network interface device 150 exchanges signals with the STN network access point, e.g. the satellite 130, to gain access to and become a client of the STN network 130, and if possible to gain access to services of the STN 130, e.g. to gain access to the WAN 100, for telephone and video conferencing, to access audio and video content, to determine GPS coordinates, etc.

A fifth wireless network interface device 152 may comprise one or more other wireless receivers or transceivers configured to communicate with two-way radio or pager networks or configured to receive radio and television broadcast channels from the access point 190 in FIG. 1. For example the network interface device 152 may comprise a tunable receiver for manually or automatically scanning or otherwise adjusting to receive an analog electromagnetic signal of a desired frequency, e.g. a conventional AM radio signal in the frequency range of 525 kHz to 1715 kHz or conventional FM radio and television signals in the frequency range of 30 MHz to 400 MHz, or another broadcast signal. Alternately, the network interface device 152 may comprise a tunable transceiver for exchanging two-way radio communication signals over a desired radio band e.g. a military, marine, municipal, citizen band, corporate, and amateur or other two-way radio network at selected frequencies.

In addition the mobile router 140 may include still further network interface devices configured for any other specialized wireless network communication such as Radio Frequency Identification, (RFID), infrared telecommunication bands, visible telecommunication bands such as laser emitters and receivers an any other wireless communication device. In addition, the mobile router 140 may also include one or more wire network interface devices such as an Ethernet interface device for interfacing with a wired network such as a local area network LAN when one is available.

Mobile Router Client Device

Further according to the present invention, the mobile router 146 comprises a host network device for hosting one or more client devices. In particular, the WLAN interface device 148 includes a transceiver configured to communicate with WLAN configured client devices 172, 174 and to exchange WLAN configured network signals therewith. In addition, the controller 142 is configured as a WLAN network controller and router for accepting client devices onto the WLAN network designated 170, and controlling communication traffic to each client device therein, 172, 174. In addition the controller 142 is configured to receive a communication signal from a WLAN configured client device, e.g. an email message, and to reconfigure the email message for transmission to a cellular configured host device, e.g. 110, for delivery to an email recipient via the WAN 100. Conversely, the controller 142 is configured to receive a communication signal, e.g. a return email message, from a cellular configured host network, e.g. 110, and reconfigure the return email message for transmission to a WLAN configured client device, eg. 172, 174.

As shown in FIG. 1 the WLAN usable network region 170 includes client devices 172, a WLAN configured lap top computer, and 174, WLAN configured speakers or head sets, telephones, video display devices, PDA's, printers, scanners, faxes, memory devices, etc. Generally the WLAN may operate according to one or more of the Wi-Fi, IEEE 802.11, WiMax, IEEE 802.16, wireless Ethernet IEEE 802.3, or any other WLAN communications standards.

In addition, the WLAN configured client device 172 may comprise a network access point for a PAN network 176 which includes PAN configured client devices 178 such as audio speakers or headsets, PDA's, key board, mouse, printer, scanner etc.

In addition or alternately, the PAN network interface device 146 includes a transceiver configured to communicate with PAN configured client devices and to form a PAN network 180 to exchange signals with PAN configured client devices 182, 184 as well as PAN configured devices 176 and 178. In addition, the controller 142 is configured as a PAN network controller and router for accepting client devices onto the PAN network 180 and controlling communication traffic to each client device, 182, and 184. In addition the controller 142 is configured to receive a communication signal from a PAN configured client device, e.g. an email message from a PDA and reconfigure the email message for transmission to a cellular configured host device for delivery to recipient via the WAN 100. Conversely, the controller 142 is configured to receive a communication signal, e.g. a return email message, from a cellular configured host network, e.g. 110, and reconfigure the return email message for transmission to a PAN configured client device, e.g. 182, 184. Generally the PAN network 180 may operate according to one or more of the Bluetooth, IEEE 802.15.1, ZigBee, IEEE 802.15.4, Ultra Wide Band, UMB, IEEE. 802.15.3a or any other PAN communications standards.

The Network Controller

Figure 2:
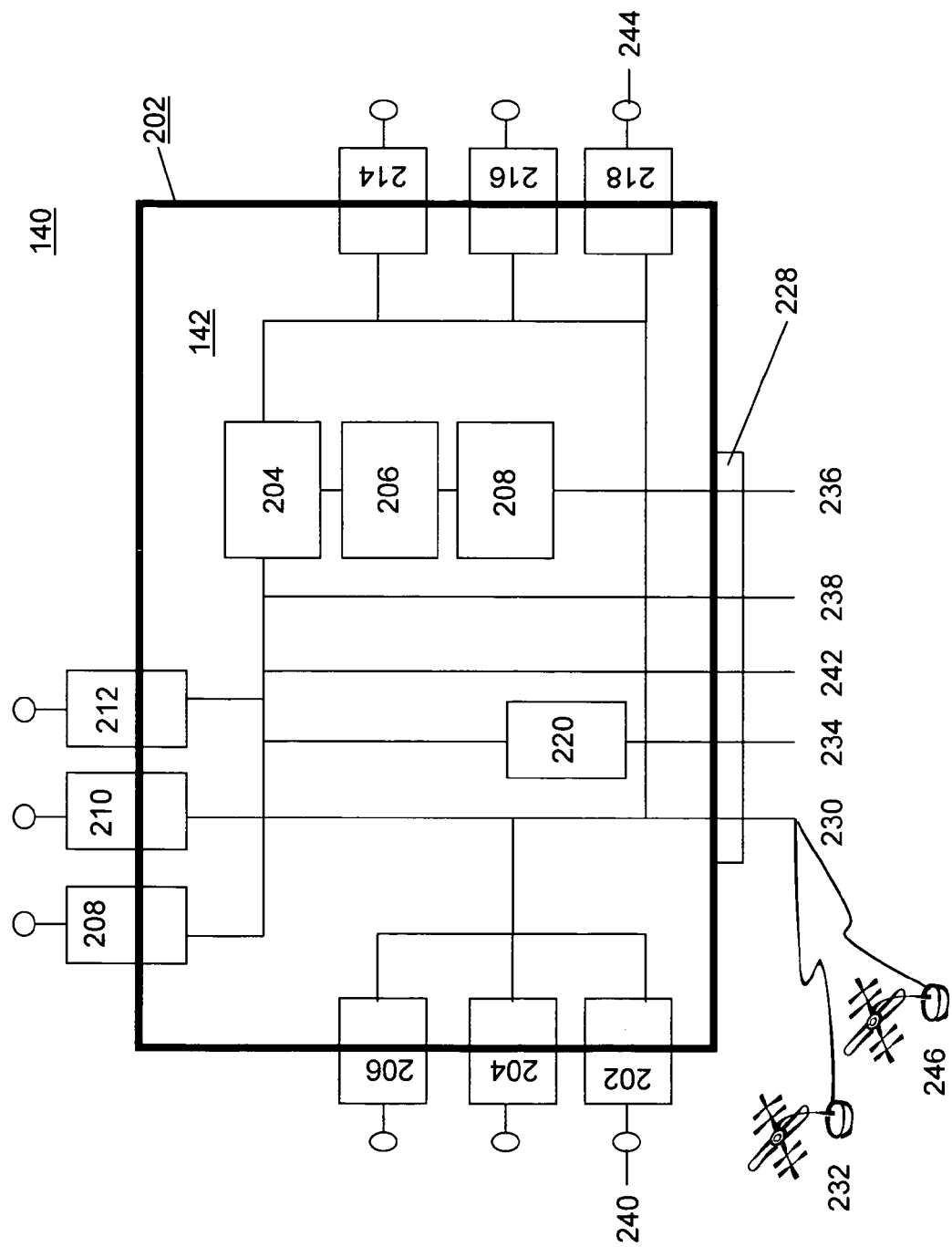
FIG. 2 illustrates a schematic representation of one example of a mobile router according to the present invention.

Turning now to FIG. 2 a mobile router 140 according to the present invention comprises a controller 142 configured as a printed circuit board or mother board having various integrated circuit elements formed thereon and attached thereto. The mobile router 140 also includes a plurality of network interface devices, 202, 204, 206, 208, 210, 212, 214, 216, 218 and 220 interfaced with the controller 142 and in communication therewith. Generally the controller 142 and each of the network interface devices 202-220 are housed within a conventional electronic module enclosure 202 configured to protect the enclosed elements from contaminates, mechanical damage, including shock, moisture, electromagnetic emissions, electrical shock, and other hazards, as well as to serve as a common ground plane, all as is well known in the art. Generally, a network interface device 202-220 may be configured in a number of different embodiments depending on the availability and complexity of the interface device. However the network interface devices may comprise any one of the following configurations including a combination of more than one configuration. A separate printed circuit board, such as a daughter board attached to the controller 142. Printed and additional circuit elements formed integral with the controller mother board. Circuit elements contained within a central microprocessor unit, (CPU) 222. A Portable Computer, (PC), card installed within a card slot provided through the enclosure 202 and interfaced with the controller 142 by a card slot interface. An external device communicating with the controller 142 over a serial or network interface.

The controller 142 includes a conventional digital microprocessor or CPU 222, e.g. offered by INTEL Corp, AMD Corp. MIPS Corp. etc. Alternately the CPU 222 may be a conventional Network Storage Processor or the like, specifically configured for network data processing. The controller 142 includes one or more digital memory modules 224 in communication with the microprocessor 222 for storing digital data and program instructions therein. The memory modules 224 may include one or more of various memory types such as random access memory, (RAM), read only memory ROM, FLASH ROM, various removable or permanent disk memories etc., and the memory modules 224 may be mounted on the controller 142, installed as PC cards or otherwise contained within or associated with the enclosure 202, including external devices communicating with the controller 142.

The controller 142 further includes a power module 226 for controlling the distribution of power throughout the mobile router 140. The power module 226 may be connected to an external power source e.g. a conventional AC wall outlet or a conventional 6, 12, 40 or other volt vehicle power outlet, or any other external power source that is suitably configure to deliver power to the power module 226, or the power module 226 may include internal power source elements, e.g. a battery, fuel cell battery charging circuit etc. Generally the power module interfaces with the microprocessor 204 and with each element of the mobile router 140 through the controller PC board to deliver and control power as needed, and if desired to include power saving functionality such as selecting a different power source, reducing power consumption, activating power in response to various inputs etc., all in accordance with predefined power controlling software controlling parameters.

The mobile router 142 further includes a conventional wire connecting input output I/O interface 228. The I/O interface 228 includes a plurality of wire connectors supported by the enclosure 220 for connecting and communicating with external devices. In particular, the I/O interface 228 includes one or more antenna interfaces 230. Each antenna interface 230 connects with an external antenna 232 specifically tuned as an electromagnetic or magnetic wave receiving and transmitting device for a desired wireless communication channel or frequency range and configured to produce an analog electrical signal in response to electromagnetic or magnetic waves being received thereby or to emit electromagnetic or magnetic waves in response to an analog electrical signal. In addition, the external antennas 232 or antenna interfaces 230 may include a signal amplifier for amplifying the analog electrical signal produced by or delivered to the antenna. In addition, each wire connected between the external antenna 232 and a wireless network interface element 202-218 is preferably configured to shield and properly ground the antenna analog signals from external interference and disturbance.

The I/O interface 228 may also include a wire network interface 234 including one or more wired network connectors for connecting the mobile router 140 directly to a wired network such as a local area network, LAN or WAN or to any other wire network configured device including a computer, server, data storage device, PDA, printer, scanner, video display device, audio playback system, camera, telephone, router, wireless network access point, external antenna, etc. In one example, the wired network interface device 234 is an Ethernet network interface and the mobile router 140 includes an Ethernet network interface device 220. The Ethernet interface device 220 may comprise a PC card in a card slot; a circuit formed on the controller PC board 142 or may be incorporated within the CPU 222.

Additionally, The mobile router 140 may also have universal serial bus (USB), Firewire (IEEE 1394), IDE, Serial-ATA interface devices which provide for interfacing to local data storage devices (disks) or other peripherals. Serial RS232/422/485 and GPIB (IEE488) interface devices can interface with other peripherals, and the data to and from these networks can be routed to and from any other connecting network. Furthermore, local peripherals for control and setting of the mobile router or for user input/output may exist. These may include speaker outputs, a video screen, a microphone, or a user-control (buttons, etc.) on the router itself. All of these peripherals can be routed to any of the other networks as well. (For instance, audio or video data from any network can go to the local peripheral in addition to being routed to attached network devices.)

The I/O interface 228 includes one or more external power input connectors 236 for connecting to external power sources. The I/O interface 228 may include one or more wire ports 238 configured for serial or parallel communications between the CPU 222 and an external device, e.g. using an USB or RS232 serial communication technique. The communication ports 238 may be used to interface with a computer, server, data storage device, PDA, printer, scanner, video display device, audio playback system, camera, telephone, router, wireless network access point, external antenna, etc. The I/O interface 228 may also include one or more analog or digital wire ports 242 configured for connecting with an audio, video, telephone, or other devices as my be required to exchange analog or digital signals therewith.

Generally each wireless network interface device 202-218 includes an integral antenna 240 or an external antenna 232. The antenna is configured to receive and or transmit or emit electromagnetic waves of a particular radio or microwave frequency. Each wireless network interface device 202-218 at least includes a receiver associated with the antenna for converting antenna signals into analog electrical signals and for converting the analog electrical signals into digital signals readable by the CPU 204. In addition, each wireless network interface device 202-218 may include a transmitter associated with the antenna for converting digital signals received from the CPU 204 into analog electrical signals delivered to the antenna to generate electromagnetic or magnetic wave signals and to transmit or emit the analog electromagnetic or magnetic wave signals into the surrounding area. In addition some wireless network interface devices 202-218 may be configured as tunable transceivers for tuning to a desired frequency for receiving various radio, television or microwave channels such as a radio or television stations or to select a two-way radio band. In other examples a tunable transceiver may be used to change cellular networks or to change WLAN networks.

In one example of a mobile router 140 according to the present invention one or more network interface devices 202, 204, 206 are configured as cellular network interface devices for exchanging electromagnetic wave signals with cellular access points, e.g. 112, 114, 116 in FIG. 1 and for becoming a client device on a cellular network. In addition, one or more network interface devices 214, 216, 218 are configured as wireless local area network WLAN or as personal area network PAN access points for exchanging electromagnetic signals with one or more client devices configured to communicate with a WLAN or PAN access point or for becoming a client device on a WLAN or PAN network. In addition, one or more wireless network interface devices 208, 210 and 212 are configured to communicate with a satellite, (STN, GPS), radio, (AM/FM, two-way), television, infrared, or any other wireless network available.

In a preferred embodiment the mobile router 140 comprises a first network interface device 202 comprising a 1× Evolution-Data Optimized, EVDO/1×RTT or just EVDO configured cellular PC card installed in a card slot connected to the network controller 142. In addition the EVDO configured interface device 202 is connected to an external 1.9 GHz PCS antenna 232 through a low loss microwave cable and bulkhead grommet. The EVDO cellular interface is a Code Division Multiple Access, (CDMA) wireless broadband data interface standard used by a large number of cellular network service provides and access to a cellular network over the EVDO configured interface device 202 is generally available wherever cellular access points are available.

In addition the preferred mobile router 140 comprises a second network interface device 218 comprising a wireless fidelity, Wi-Fi configured device for communicating with Wi-Fi configured client devices. The Wi-Fi or IEEE 802.11 communication standard and network architecture is used by many wireless local area network WLAN configured devices and its use is expanding to other devices such that most wireless network configured devices will be able to communicate with the Wi-Fi interface device 218.

Generally, the preferred embodiment described above operates as follows. Upon power up, the CPU 204 communicates with the first wireless network interface device 202 to initiate a search for available EVDO configured cellular network access points and selects an optimal cellular access point to communicate with. The CPU 204 may then initiate an action to make the mobile router a client on the host EVDO configured cellular network 110 and to access services provided by the cellular network 110. In addition, the CPU 204 communicates with the second wireless interface device 218 to establish a WLAN 170 over a usable range and to initiate a search for available Wi-Fi configured client devices 172, 174 located within the usable range. Upon finding Wi-Fi devices, 172, 174, the CPU 204 assigns a Wi-Fi address to each device and communicates to each client device that a network access point is available.

Thereafter, each Wi-Fi client device 172, 174 may communicate with the Wi-Fi interface device 218 using Wi-Fi network signals, e.g. to initiate a connection with the WAN 100. The Wi-Fi network signals are received by the wireless network interface device 218, converted to digital signals readable by the CPU 204 and reconfigured by the CPU 204 as EVDO network signals and sent to the EVDO configured interface device 202 to be converted to analog radio signals and sent to the cellular network 110, and eventually the WAN 100. Upon receiving a return signal from the WAN 100 and cellular network 110 in an EVDO format, the first wireless network interface device 202 converts the analog EVDO signal to a digital signal readable by the CPU 202 and the CPU 202 converts the return EVDO signal to a Wi-Fi signal and sends the return Wi-Fi signal to the designated wireless client device 172 or 174.

Thus according to one aspect of the present invention, the mobile router 140 acts as a wireless network signal converting device for converting a Wi-Fi formatted wireless signal to an EVDO formatted wireless signal and for converting an EVDO formatted wireless signal to a Wi-Fi formatted wireless signal.

In further aspects of operating the preferred mobile router 140, the CPU 202 is programmed to periodically update information about the wireless network environment by repeatedly checking the availability of a more desirable cellular access point and by repeatedly checking the status of client devices in the WLAN area 170. This is done to make sure the mobile router 140 stays continuously connected to the EVDO cellular network even as the mobile router moves with respect to the wireless environment. In addition, the wireless router 140 is programmed to repeatedly send update messages to the cellular network to ensure that host device does not terminate the client device connection due to inactivity. In addition, the wireless router 140 is programmed to perform cellular network access point hand offs without losing a connection with the host cellular network. In particular this is accomplished by continuously communicating with two more cellular access points to hand off communications to the best available access point or if warranted to divide communication traffic between two or more cellular access points to increase bandwidth or improve reliability as may be required.

Generally the preferred EVDO mobile router 140 including the external antenna 232 is capable of maintaining a continuous connection with a cellular network over most of the network environment. In particular, the external cellular antenna 232, especially when used with a signal amplifier has a range of approximately 30 miles, which is significantly better than the range of an average cell phone or PDA which is typically 0.5-8.0 miles. In addition, the external antenna interface 230 is easily connected with a built-in vehicle, water craft, or aircraft when the mobile router 140 is being used therein.

In addition, the mobile router 140 may also include an external Wi-Fi antenna 246 optimized for 2.4 GHz signals and optionally including a signal amplifier to increase the usable range of the Wi-Fi network 170 and to gain access to another Wi-Fi network e.g. WLAN 160. In one particularly useful application of the mobile router 140 configured with an external Wi-Fi antenna 246, the router 140 may be used to access and become a client on a nearby Wi-Fi configured WLAN 160 and to gain access to a WAN 100 through the WLAN 160. In this case, the usable range of the network interface device 218 configured with a Wi-Fi optimized external antenna 246 will usually exceed the range of the client devices 172 and 174 which do not generally include a separate external Wi-Fi antenna. Thus the mobile router 140 may become a client device the WLAN 160 and exchange Wi-Fi signals directly between the client devices disposed within the WLAN 170 and the WLAN 160. The above described use of the mobile router 140 is particularly useful when the only available cellular network is a pay per use service and the WLAN 160 provides non-pay network access. To take advantage of this situation, the controller 142 is programmed to review all available wireless network access points and to select the best available notwithstanding the network type.

In further embodiments of the mobile router 140, additional cellular network interface devices 204 and 206 may be added to increase the type of cellular networks that can be accessed. Specifically, each cellular network interface device 202, 204, 206 may be configured to communicate with a different cellular network type to increase the likelihood that continuous cellular network access can be maintained. For example the device 202 is configured as an EDVO interface device for communicating with one or more EDVO networks. The device 204 is configured as an Enhanced Data rates for GSM Evolution, or EDGE interface device for communicating with one or more EDGE configured cellular networks. The device 206 is configured as another cellular interface device as may be required to communicate with another cellular network type including us any one of, or a combination of, the Global System for Mobile Communications (GSM), General Packet Radio Service (GPRS), Code Division Multiple Access (CDMA), 3GSM, Digital Enhanced Cordless Telecommunications (DECT), Digital AMPS (IS-136/TDMA), and Integrated Digital Enhanced Network (iDEN) cellular network configurations.

In further embodiments of the mobile router 140, additional cellular network interface devices 204 and 206 may be added to increase the number of cellular network connections that can be established e.g. to increase the communication bandwidth capacity between the mobile router 140 and the cellular network 110. In this example each of the cellular network interface devices 202, 204, 206 may comprise an EDVO configured device and each of the EDVO configured devices can be configured to act as a separate client device on the host cellular network to increase bandwidth. Moreover, each EDVO device may have a different cellular network account or phone number and each device may have a different set or cellular network service options.

In further embodiments of the mobile router 140 variously configured wireless network interface devices 214, 216, 218 may be used to establish various wireless local area networks, e.g. 170, 174 and others to communicate with devices of various wireless network configurations. In addition two or more wireless network interfaces 214, 216, 218 may be configured as a single type network device to increase communication bandwidth and or to increase the number of client device that can be supported. Specifically the wireless interface devices 214, 216, 218 may be configured according to any one of the Wi-Fi, IEEE 802.11, Bluetooth, IEEE 802.15, WiMax, IEEE 802.16 Home RF, Ultra Wide Band, UWB, Zigbee, IEEE 802.15.4, or other wireless networks standards or protocols.

In addition, the controller 142 may be configured to operate in various network environments such as a Mobile ad-hoc Network (MANET), a peer to peer, P2P networks, a mesh network, an infrared sensor network, or other network type and exchange signals from one network type to another as described above.

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications, e.g. a wireless cellular and wireless local area network environment, those skilled in the art will recognize that its usefulness is not limited thereto and that the present invention can be

What we claim:

1. A network router comprising:
   a network controller;
   a plurality network interface devices each in communication with the network controller and each configured to become a client of a cellular network and to exchange network signals of a cellular network signal configuration between the cellular network and the network controller;
   a network interface device in communication with the network controller configured as a local area network access point for hosting local area network configured client devices and for exchanging network Signals of local area network signal configuration between the local area network client devices and the network controller;
   program steps operating on the network router for reconfiguring the cellular network signal configuration to the local area network signal configuration and for reconfiguring the local area network signal configuration to the cellular network signal configuration;
   an enclosure for housing the network controller, the plurality of cellular network interface devices and the network interface device configured as a local area network access point; and,
   an I/O interface comprising a plurality of wire connectors supported with respect to the enclosure for providing wire signal ports interconnected with elements of the network router-including.

2. The network router of claim 1 wherein:
   the network interface device configured as a local area access point comprises a first network interface device configured as a wireless local area network (WLAN) access point and second network interface device configured as a wire local area network (LAN) access point; and,
   the program steps operating on the network router include steps for, routing network traffic from each of the plurality of cellular network interface devices that is a current client of the cellular network to appropriate client devices of one of the WLAN access point mid the LAN access point and for reconfiguring the cellular network signal configuration to an appropriate one of a WLAN and a LAN local area network signal configuration and for reconfiguring the WLAN and the LAN signal configurations to the cellular network signal configuration.

3. The network router of claim 1 wherein:
   the cellular network comprises a plurality of cellular networks each having a different cellular network signal configuration;
   the plurality of cellular network interface devices include at least one cellular network interface device configured to become a client of and communicate with each of the plurality of cellular networks using an appropriate cellular network signal configuration;
   the program steps operating on the network router for reconfiguring the cellular network signal configuration to the local area network signal configuration include program steps for converting each of the different cellular network configurations to the local area network signal configuration, and
   the program steps operating on the network router for reconfiguring the local area network signal configuration to the cellular network signal configuration include program steps for converting the local area network signal configuration to each of the different cellular network signal configurations.

4. The network router of claim 1 further comprising a separate external cellular antenna interfaced with each of the plurality of cellular network interface devices.

5. The network router of claim 1 wherein the plurality of cellular network interface devices includes one network interface device configured for communicating according to any one of the Global System for Mobile Communications (GSM), General Packet Radio Service (GPRS), Universal Mobile Telecommunications System (UMTS), High-Speed Downlink Packet Access (HSDPA), High-Speed Unlink Packet Access (HSUPA), Code Division Multiple Access (CDMA), Evolution-Data Optimized (EVDO), Enhanced Data Rates for GSM Evolution (EDGE) 3GSM, Digital Enhanced Cordless Telecommunications (DECT), Digital AMPS (IS-136/TDMA), or Integrated Digital Enhanced Network (iDEN), cellular communications standards.

6. The network router of claim 1 wherein each of the plurality of network interface devices configured to become a client of a cellular network is substantially identical and configured to become a client device of the same cellular network simultaneously.

7. The network router of claim 1 wherein the plurality of network interface devices configured to become a client of a cellular network includes network interface devices configured to become a client of at least two different cellular network types, simultaneously, using at least two different cellular network signal configurations and further wherein the program steps operating on the network router include program steps for reconfiguring the at least two different cellular network signal configurations to the local area network configuration and for reconfiguring the local area network signal configuration to each of the at least two different cellular network signal configurations.

8. The network router of claim 1 wherein the network interface device configured as a local area network access point comprises a plurality of different local area network interface devices each in communication with the network controller and each configured to operate using a different local area network signal configuration and to host a different set of client devices wherein:
   the program steps operating on the network router include program steps for routing network traffic from each of the plurality of local area network interface devices to at least two of the plurality of cellular network interface devices when at least two of the plurality of cellular network interface devices is a current client of the cellular network.

9. The network router of claim 1, further comprising a GPS signal receiver in communication with the network controller for receiving GPS signals; and, programs steps operating on the network router for determining GPS coordinates of the network router.

10. The network router of claim 1 further comprising:
   a network interface device configured to access audio and video broadcast signals at selected frequencies in communication with the network controller; and,
   program steps operating on the network router for reconfiguring the audio and video broadcast signals to the local area network signal configuration for delivering the audio and video broadcast signals to the local area network configured client devices.

11. The network router of claim 1 wherein the local area network signal configuration comprises any one of Wi-Fi, (IEEE 802.11), WiMAx, IEEE 802.16, Bluetooth, (IEEE 802.15.1), ZigBee, (IEEE 802.15.4) and UMB, (IEEE. 802.15.3a).

12. The network router of claim 1 further comprising an external antenna interfaced with the I/O interface and interconnected with the network interface device configured as a local area network access point.

13. A method for operating a wireless network router that comprises a network controller in communication with a plurality of cellular network interface devices each configured to become a client of a cellular network and further in communication with a network interface device configured as a local area network access point comprising the steps of:

communicating with the cellular network to establish at least two of the plurality of cellular network interface devices as a client of the cellular network;

communicating with local area network client devices to establish one or more local area network configured client devices as a client of the local area network access point;

exchanging cellular network signals having a cellular network signal configuration between the cellular network and the network controller over each of the cellular network interface devices that is established as a client of the cellular network;

exchanging local area network signals between the client devices of the local area network and a second the network controller over the network interface device configured as a local area network access point;

converting cellular wireless network signals received from the cellular network to a local area network signal configuration;

converting local area network signals received from the client devices of the local area network to a cellular network signal configuration;

routine network traffic received from the client devices of the local area network to the cellular network over each of the cellular network interface devices that is established as a client of the cellular network; and, routing the network traffic received from the cellular network to appropriate client devices of the local area network over each of the cellular network interface devices that is established as a client of the cellular network.

14. The method of claim 13 wherein each of the cellular network interface devices that is established as a client of the cellular network is a different client of the same cellular network.

15. The method of claim 13 wherein the cellular network comprises at least two cellular networks operating with at least two different cellular network signal configurations and wherein at least two of the cellular network interface devices that are established as a client of the cellular network are clients of a different cellular network of simultaneously exchanging first wireless.

16. The method of claim 13 further comprising the steps of sending periodic update messages to the cellular network over each of the cellular network interface devices that is established as a client of the cellular network to prevent termination of the network interface devices as clients of the cellular network.

17. The network router of claim 3 wherein the program steps operating on the network router include program steps for routing network traffic from the local area network configured client devices to at least two of the plurality of cellular networks when at least two of the plurality of cellular network interface devices is a current client of the cellular network.

18. The network router of claim 1 further comprising a single external cellular antenna connected to the I/O interface and in signal communication with each of the plurality of network interface devices configured to become a client of a cellular network.

19. The network router of claim 6 further comprising programs steps operating on the network router for routing network traffic from the client devices of the local area network to the cellular network over at least two of the plurality of cellular interface devices when at least two of the plurality of cellular network interface devices is a current client of the cellular network.

20. The method of claim 15 wherein the step of converting cellular network signals received from the cellular network to a WLAN network signal configuration further comprises the step of converting cellular network signals of two or more cellular network configurations to the WLAN network signal configuration.

* * * * *